United States Patent
Rosenberg et al.

(10) Patent No.: US 7,912,748 B1
(45) Date of Patent: Mar. 22, 2011

(54) METHOD AND SYSTEM FOR DETERMINING PRICE MARKDOWN SCHEDULE

(75) Inventors: Adam N. Rosenberg, Scottsdale, AZ (US); Jeffrey D. Moore, Scottsdale, AZ (US)

(73) Assignee: SAP AG, Walldorf (DE)

( * ) Notice: Subject to any disclaimer, the term of this patent is extended or adjusted under 35 U.S.C. 154(b) by 1291 days.

(21) Appl. No.: 11/421,529

(22) Filed: Jun. 1, 2006

Related U.S. Application Data

(60) Provisional application No. 60/686,217, filed on Jun. 1, 2005.

(51) Int. Cl.
*G06Q 99/00* (2006.01)

(52) U.S. Cl. ....... 705/10; 705/1.1; 705/7.35; 705/14.35; 705/400

(58) Field of Classification Search ................ 705/7, 10, 705/28, 400
See application file for complete search history.

(56) References Cited

U.S. PATENT DOCUMENTS

| | | | |
|---|---|---|---|
| 6,182,053 B1 | 1/2001 | Rauber et al. | |
| 6,549,891 B1 | 4/2003 | Rauber et al. | |
| 6,910,017 B1 | 6/2005 | Woo et al. | |
| 7,092,929 B1 * | 8/2006 | Dvorak et al. | ................. 705/28 |
| 2001/0032128 A1 | 10/2001 | Kepecs et al. | |
| 2002/0116267 A1 | 8/2002 | Weisz et al. | |
| 2003/0229502 A1 | 12/2003 | Woo | |
| 2004/0182924 A1 | 9/2004 | VerEecke et al. | |
| 2005/0060270 A1 | 3/2005 | Ramakrishnan | |
| 2005/0108090 A1 | 5/2005 | Takeda et al. | |
| 2005/0194431 A1 | 9/2005 | Fees et al. | |
| 2005/0194439 A1 | 9/2005 | Zuerl et al. | |
| 2005/0197887 A1 | 9/2005 | Zuerl et al. | |
| 2005/0197896 A1 | 9/2005 | Veit et al. | |
| 2005/0197897 A1 | 9/2005 | Veit et al. | |
| 2005/0197898 A1 | 9/2005 | Veit et al. | |
| 2005/0197899 A1 | 9/2005 | Veit et al. | |
| 2005/0197900 A1 | 9/2005 | Veit | |
| 2005/0197901 A1 | 9/2005 | Veit et al. | |
| 2005/0197902 A1 | 9/2005 | Veit | |
| 2005/0256753 A1 | 11/2005 | Veit et al. | |
| 2006/0161504 A1 * | 7/2006 | Walser et al. | ................. 705/400 |

FOREIGN PATENT DOCUMENTS

WO    WO 0048104 A1 *   8/2000

OTHER PUBLICATIONS

Fleischmann et al., "Smart Pricing: Linking Pricing Decisions With Operational Insights", 2004, ERIM, 16 pages.*
Federgruen et al., "Combined Pricing and Inventory Control Under Uncertainty", May-Jun. 1999, Operations Research, vol. 47, No. 3, pp. 454-475 (22 pgs).*

* cited by examiner

*Primary Examiner* — John W Hayes
*Assistant Examiner* — Freda A Nelson
(74) *Attorney, Agent, or Firm* — Schwegman, Lundberg & Woessner, P.A.

(57) ABSTRACT

Markdown optimization may be performed using a computer system. Markdown objectives may include margin maximization or inventor minimization. Markdown schedule optimization uses an efficient, iterative, targeted combinatorial search. First, permissible discount steps are identified, then for each permissible discount step, a subspace of permissible step dates is identified. Elements from the date step subspace and price reduction subspace are combined and evaluated against the markdown objectives. If an improved markdown schedule is located, a new subspace of permissible step dates is defined to search the subregion of the solution space where the improved markdown optimization schedule was identified. Scheduling of inventory allocation from a distribution center is also disclosed.

12 Claims, 8 Drawing Sheets

FIG 3
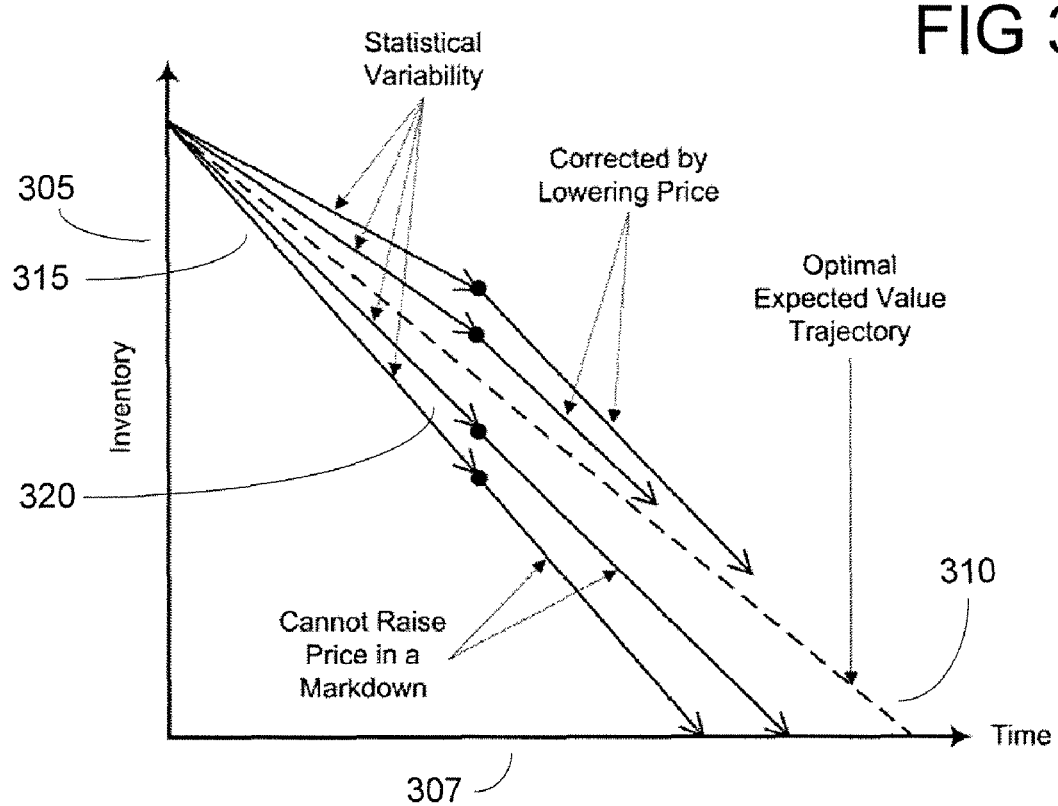
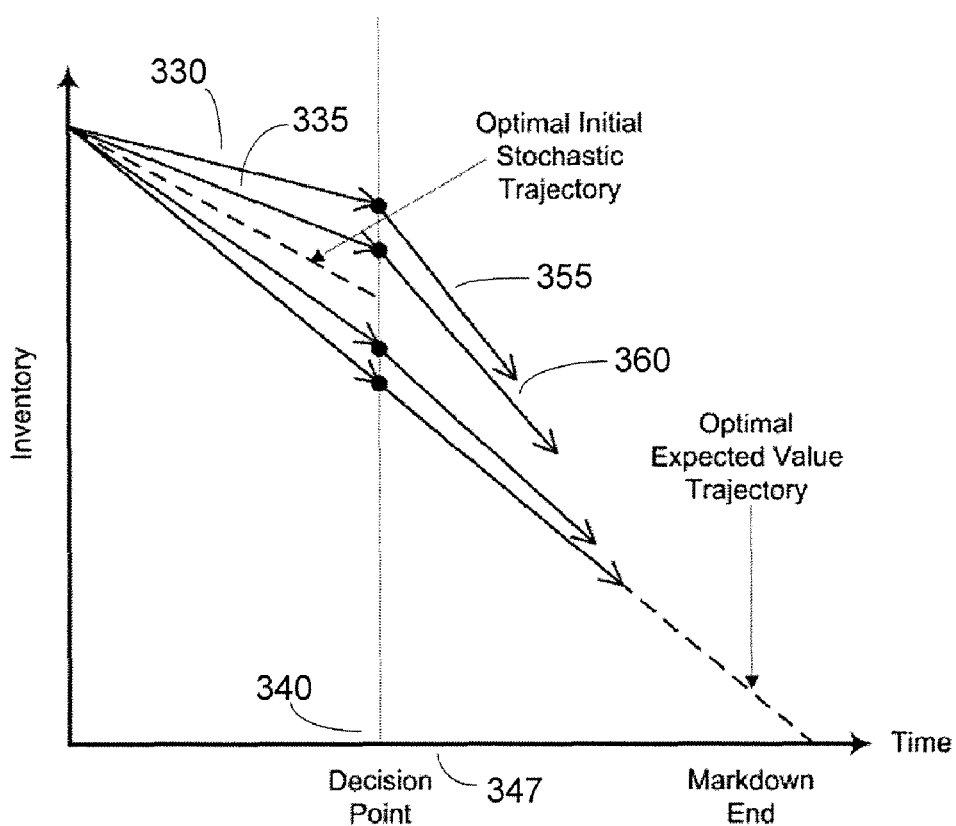

METHOD AND SYSTEM FOR DETERMINING PRICE MARKDOWN SCHEDULE

CROSS-REFERENCE TO RELATED APPLICATION

This application claims benefit of provisional application Ser. No. 60/686,217, filed Jun. 1, 2005, the disclosure of which is expressly incorporates herein by reference.

TECHNICAL FIELD

An embodiment in accordance with the present invention concerns a method and apparatus for determining a preferred pricing markdown schedule for items. In general, an embodiment in accordance with the present invention relates generally to the technical field of apparatus and corresponding methods for performing data processing operations in which there is a significant change in the data or for performing calculation operations wherein the apparatus or method is uniquely designed for or utilized in the practice, administration, or management of an enterprise, or in the processing of financial data. An embodiment in accordance with the present invention also relates to the technical field of apparatus and corresponding methods for performing data processing or calculating operations in which a charge for goods or services is determined. An embodiment in accordance with the present invention further relates to the technical field of subject matter wherein an electrical apparatus such as a general purpose or specially programmed computer and its corresponding methods perform the data processing operations, in which there is a significant change in the data or for performing calculation operations wherein the apparatus or method is uniquely designed for or utilized in the practice, administration, or management of an enterprise, or in the processing of financial data. An embodiment in accordance with the present invention further relates to the technical field of subject matter particularly designed for price reduction of the purchase of a commodity or service.

BACKGROUND

Product life-cycle management in general includes price optimization for each period of a product's life-cycle periods. Product in this context can indicate goods or services or a combination of goods and services. Life-cycle periods in general include introduction, discontinuation, regular, and promotion periods. An embodiment in accordance with the present invention relates to improved price schedule determination during product discontinuation. Embodiments in accordance with the present invention relate generally to new and useful methods for markdown optimization.

Pricing during product discontinuation is referred to herein as "markdown pricing". A markdown is a retail activity wherein a store or group of stores sells its or their remaining inventory of a product or group of products for a designated period of time. A markdown is also sometimes called a clearance or, more casually, a blowout. In contrast to usual retail sales where inventory is continually replenished as needed, markdown inventory generally is considered fixed and perishable. Once the end of the markdown time interval is reached, the remaining inventory in general has a salvage value, which may be zero. Markdowns have sometimes been based on heuristic rules. For example, at end of season, the merchant might markdown products twenty percent off for the first two weeks, then fifty percent off for next two weeks, then seventy-five percent off the last two weeks.

Optimization as that term is used herein denotes the determination of a result particularly desirable among results considered. Optimization does not necessarily imply determination of a global optimum over an entire solution space, but relates instead to a process of identifying solutions that are more and more optimized in comparison to other solutions.

Shopper demand for markdown products in markdown stores is generally time dependent over the markdown interval. Shopper demand may vary over time with changes in number of shoppers considering buying marked-down inventory.

Shopper demand may also vary over time with changes in the quantities of product that shoppers buy as a function of price. The discounting activity of the markdown process can create its own additional demand factor called promotional lift in addition to the increase in sales from reduced price; that is, the pattern of successive decreases in price may produce promotional lift independent of the effect of a temporary reduction in price.

A markdown is defined by a markdown schedule. A markdown schedule comprises the sequence of price cuts from regular price. While price is not required to change over time, price changes during a markdown period are only downward in discrete steps.

Some markdown optimization approaches have used general optimization algorithms, genetic algorithms, or exhaustive search. Those algorithms tend to be very slow when considering thousands of products in thousands of stores with a large number of possible price points and time step points. General optimization methods are relatively slow. Such general optimization methods are therefore suitable only in batch optimization and forecasting methods. There exists a need for an optimization method suitable for on-demand re-optimization.

Inventory has in other approaches sometimes been allocated based on overall sales volume of each store. High volume stores in those approaches receive more inventory than low volume stores. However, such methods generally do not account for product-level preferences in each store. Such methods generally do not account for product-level demand, inventory or markdown optimization given an inventory. Such methods also generally do not incorporate price and promotional planning. There exists a need, therefore, for an improved inventory allocation data processing operation.

There exists a need for the ability to provide a markdown schedule for product-store combinations that are divided into schedule groups, where all products and stores in each group are related in their markdown schedules. There exists a need for an improved markdown optimization capable of optimizing markdown schedules at the level of product groups or at the level of individual products or, in industries where applicable, the individual shop-keeping unit, or SKU. A schedule group might contain products with different prices as the discounts can be related by discounting common fractions of price.

There exists a need for the ability to provide a markdown schedule that can be updated while the markdown is in progress. The history-plus-proposed-markdown behavior can be subject to the constraints of certain rules defining acceptable markdown pricing. For example, if some products are selling fewer than expected, then future markdown prices might be reduced for the rest of the markdown interval.

There exists a need also for the ability to provide markdown schedule that concerns allocation of inventory from a distribution center to stores for each product in the markdown. While some inventory might be specific to a store and might not be moved to another store, some inventory might be at a distribution center at the beginning of the markdown. Each distribution center has a list of products and stores. The distribution center can allocate its inventory of markdown products to the stores in such a way as to optimize pricing and/or inventory objectives.

Other needs also exist for an improved method and system for scheduling markdown prices. There exists a need for an improved system and method for determining a markdown schedule to meet more fully the goals of inventory exhaustion and/or profit maximization. There exists a need for an improved system and method for determining a markdown schedule subject to business rules and constraints. There also exists a need for an improved system and method for determining a markdown schedule comprising a more efficient combinatorial search algorithm. There also exists a need for an improved system and method for determining a markdown schedule comprising stochastic hedging. There also exists a need for an improved system and method for determining a markdown schedule comprising joint optimization schedules for linked products and stores. There also exists a need for an improved system and method for determining a markdown schedule comprising optimized allocation of distribution center inventory. There also exists a need for an improved system and method for determining a markdown schedule comprising incremental model updates during a markdown. There also exists a need for an improved system and method for determining a markdown schedule comprising inventory and unit-sales forecasts. There also exists a need for an improved system and method for determining a markdown schedule comprising integration with regular price optimization and promotions.

BRIEF SUMMARY

One embodiment in accordance with the present invention includes a computer-implemented method of markdown schedule optimization. The method can include some or all of the following steps. Identify a measurable markdown objective. Identify a scheduling group including at least one product and at least one store. Calculate allocation of inventory from distribution centers to a store in said scheduling group. Determine a schedule of price reductions for the scheduling group, the schedule of price reductions indicating the degree and time of reductions in price in the scheduling group, wherein determining a schedule also includes some or all of the following steps. Select a permissible markdown price step from the group of permissible price steps. Provide convergence criterion with respect to the measurable markdown objective. Define a first subspace of permissible markdown times for implementing the permissible markdown price. Identify a preferable permissible markdown time for implementing the permissible markdown price. Evaluate a markdown schedule comprising the preferable permissible markdown time and the permissible markdown price step to determine if convergence criteria are met. If said convergence criteria are not met, define a second subspace of permissible markdown times for implementing the permissible markdown price step and repeating the evaluating a markdown schedule. Calculate forecasts from optimized markdown and model parameters. Output results including an updated markdown schedule. The measurable markdown objective can seek reduction in inventory or increase in margin. The schedule of price reductions can be updated during the markdown based on information collected during the markdown. The schedule of price reductions can be based on sales data for individual product lines.

Another embodiment concerns a computer program product including a computer usable medium and computer readable program code embedded on said computer readable medium to determine a markdown schedule. The computer readable program code includes code to perform steps such as the steps above.

BRIEF DESCRIPTION OF THE DRAWINGS

FIG. 3 is a graph illustrating stochastic hedging.

DETAILED DESCRIPTION

Figure 1:
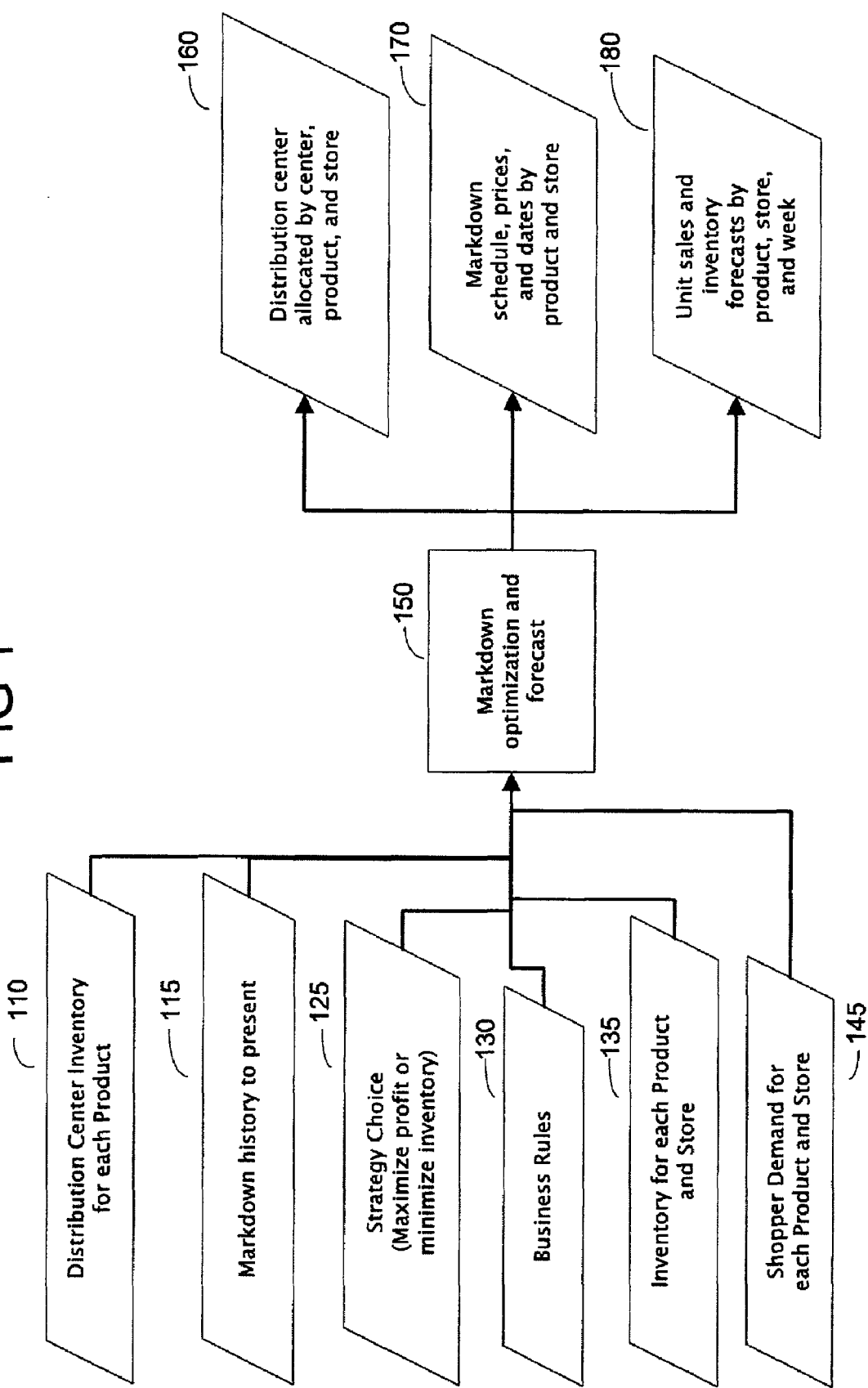
FIG. 1 depicts data flow for markdown optimization and forecasting.

While the present invention is susceptible of embodiment in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

An embodiment in accordance with the present invention includes among its objectives inventory exhaustion or profit maximization strategies. An optimized markdown strategy can in one example be assessed with respect to margin optimization to maximize profit or inventory optimization to minimize inventory, or some combination of the two.

A margin optimization has, as one object, to realize the maximum profit, where profit is equal to price minus cost times quantity sold plus salvage value minus cost for inventory remaining. A suitable cost model can take into account factors and considerations that may include product cost, salvage value, transportation cost, and carrying cost.

An inventory optimization has, as one objective, to reduce inventory to minimum levels. Ties in an inventory optimization can be broken by a margin objective. Inventory models can forecast available inventory. Inventory models can include on-hand store-level inventory, in-transit store-level inventory, and on-order store-level inventory.

Other embodiments in accord with the present invention may seek optimization of other objective functions. Multiple strategies can be accommodated by methods such as, for example, Lagrange multipliers. Other objective functions may include, for example, gross profits, dollar sales, unit sales, equivalized units, GMROI, inventory turns, price image, net profits, markdown dollars, inventory level. Another embodiment still in accord with the present invention can accommodate targeted objectives.

One embodiment in accordance with the present invention provides a method and system for determining the best price or offer. Demand forecasts provide shoppers' responses to different prices or offers. Relevant information may include store-product level forecasts; store-product-Customer level forecasts; price elasticity and non-stationary price elasticity; segmented price elasticity for store, customer segment, product; promotional lift; reference price; seasonality; cannibalization; affinity; and product life-cycle.

Business Rules

An embodiment in accordance with the present invention is also able to accommodate a variety of user-imposed business rules. User-imposed business rules impose constraints on the permissible markdown schedule. By imposing constraints on the permissible markdown schedule, user-imposed business rules define the permissible markdown schedule solution space.

An example of a user imposed business rule is having a minimum and maximum number of markdowns. The markdown solution for each schedule group can be a sequence of discrete steps in price. Having zero markdowns means maintaining regular price for the entire interval. This rule can require some minimum number of steps and forbid more than some maximum number of steps. Having a minimum and maximum number of markdowns imposes constraints on and contributes to definition of a solution space for markdowns.

Another example of a user imposed business rule is having a minimum and maximum percent off. Once there is a markdown from regular price, there may be a limit on the minimum and maximum discounted prices in terms of their percentage off regular price. Having a minimum and maximum percent off imposes constraints on and contributes to definition of a solution space for markdowns.

Another example of a user imposed business rule is having minimum and maximum change in percent off at each markdown. Each step in the markdown involves a price reduction as some percentage of regular price. This rule limits the range of price drop at each step. Having minimum and maximum change in percent off at each markdown imposes constraints on and contributes to definition of a solution space for markdowns.

Another example of a user imposed business rule is having a maximum initial percent off. The initial drop may have a more severe limit on its drop or there may be a single specified percent off for it. Having a maximum initial percent off imposes constraints on and contributes to definition of a solution space for markdowns.

Another example of a user imposed business rule is having minimum and maximum days between markdown steps. When there are two or more markdown steps, the time between them can be limited to a specified range. Having minimum and maximum days between markdown steps imposes constraints on and contributes to definition of a solution space for markdowns.

Another example of a user imposed business rule defining a solution space for markdowns is having a minimum and maximum days for the last markdown. The last markdown may have limits on its duration, which can be different from the time intervals between markdown steps. Having a minimum and maximum days for the last markdown imposes constraints on and contributes to definition of a solution space for markdowns.

Another example of a user imposed business rule defining a solution space for markdowns is having an allowed percent-off or ending-number values. A list of allowed percents off may be used or, alternatively, rules for each digit of the price may be specified for price ranges. An example of ending number rules would be ending in 0.49 or 0.99 up to five dollars, ending in 0.99 up through twenty dollars, and ending in 4.95 or 9.95 through forty dollars, and ending in 9.00 above that. Having an allowed percent-off or ending-number values imposes constraints on and contributes to definition of a solution space for markdowns. Percentage-off amounts and ending number values are examples of specifying the degree of price reduction at one price step in a markdown.

The above rules are only examples. Other examples may include rules relating to store-level out-date of inventory. Other, additional rules may exist that exclude product-stores on markdown as candidates for promotions or regular pricing.

Referring now to FIG. 1, there is show a data flow diagram for markdown optimization and forecasting. An embodiment in accordance with the present invention acts on Distribution Center Inventory For Each Product Data (110). An embodiment in accordance with the present invention acts on Markdown History To Present Data (115). An embodiment in accordance with the present invention acts on Strategy Choice (Maximize Profit Or Minimize Inventory) (125). An embodiment in accordance with the present invention acts on Business Rules Data (130). An embodiment in accordance with the present invention acts on Inventory For Each Product And Store Data (135). An embodiment in accordance with the present invention acts on Shopper Demand for each Product and Store data (145). This input flows to a Markdown optimization and forecast process (150). The Markdown Optimization And Forecast Process (150) produces output. Output includes Distribution Center Allocated By Center, Product, And Store Data (160). Output further includes Markdown Schedule, Prices, And Dates By Product And Store Data (170). Output further includes Unit Sales And Inventory Forecasts By Product, Store, and Week Data (180).

Demand Model

Shopper demand for a product in a store is modeled by the following formula:

$$D(t) = TDD(t) e^{q_0 - \beta(t)p(t) + v}$$

This formula is referred to herein as the standard demand model. In the standard demand model formula, the function D(t) represents expected demand at time t. The function TDD(t) represents a time dependent demand factor, which is multiplied by the exponential function comprising the demand curve model factor. The function p(t) represents price as a function of time. An objective of an embodiment of the markdown optimization modeler is to optimize this price function with respect to sales margin or to inventory reduction or to some combination thereof. The term $q_0$ is a scale factor of the demand curve. The function $\beta(t)$ is a parameter representing demand elasticity as a function of time. The term v represents the promotional lift and in general can be function of other factors including time and price.

If the coefficient of elasticity parameter $\beta(t)$ is a constant $\beta_0$ over the markdown interval, then the total demand can be modeled as a function of a price p constant over time according to the following formula:

$$D = Qe^{-\beta p + v}$$

This formula is referred to herein as the constant elasticity-price demand model. In the constant elasticity-price demand model formula the term Q is equal to the scale factor $q_0$ multiplied by the sum over the time of the time dependent demand factor TDD(t), as set forth in the following formula:

$$Q = q_0 \sum_t TDD(t)$$

This formula is referred to herein as the total-quantity formula. In the total-quantity formula, $q_0$ is the scale factor of the demand curve and the function TDD(t) represents the time dependent demand factor. A discrete summation is usable because a markdown schedule defines discrete time intervals.

An object of one embodiment in accordance with the present invention is to provide incremental model updates during a markdown. Knowledge of an actual markdown process is incomplete. For example, customer response to actual markdowns may provide a better indicator of factors such as elasticity and promotional lift then would historical data accumulated before the markdown period. This incomplete knowledge can be represented and modeled with statistical uncertainty in the markdown models. Because of this incomplete knowledge and uncertainty, an embodiment of a markdown optimization method and system in accordance with the present invention comprises an initial optimization at the beginning of the process, followed by reoptimization calculations at points during the markdown interval.

Figure 2:
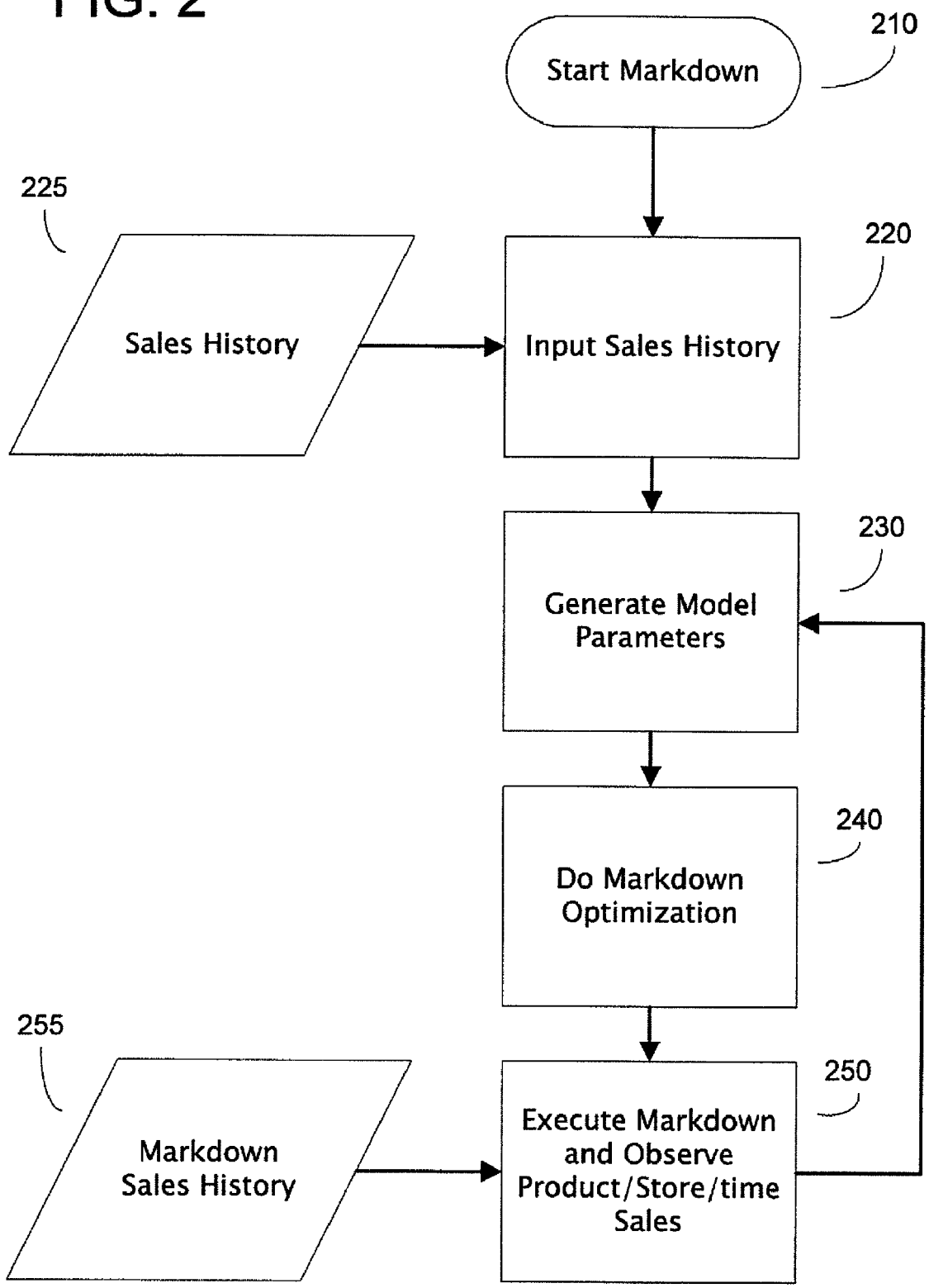
FIG. 2 depicts markdown price cuts and inventory depletion to be achieved by one embodiment in accord with the present invention.

Referring now to FIG. 2, there is shown a flow control diagram of an iterative markdown optimization process. The process is initialized with a Start Markdown Initialization (210), which configures application space and provides for storage and processing of data and parameters. Control passes next to an Input Sales History Process (220). The Input Sales History Process (220) reads as input Sales History Data (225). Control passes next to a Generate Model Parameters Process (230), which computes parameters associated with the model such as elasticity and time-dependent demand. It should be noted that markdown optimization in accordance with this disclosure and as claimed hereinbelow is considered to be within the scope of this invention whether or not the markdown optimization process also includes generation of model parameters. Control passes next to a Do Markdown Optimization Process (240), which uses the parameters to compute an expected optimized markdown schedule. Control passes next to an Execute Markdown And Observe Product Store/Time/Sales Process (250). The execute markdown and observe product store/time/sales process (250) first instructs stores to implement the markdown schedule determined, then collects data concerning Markdown Sales History Data (255). Markdown Sales History Data (255) includes information concerning sales data and consumer response during the markdown period. The data can be combined with previously read Sales History Data (225), and control passed again to the Generate Model Parameters Process (230). The Generate Model Parameters Process (230) can then compute new parameters such as elasticity and time-dependent demand in light of sales activity and consumer behavior actually observe during the markdown clearance period. The process can repeat until the markdown clearance period ends.

Scheduling for One Product and Store

To further describe and explain use of the standard demand model in determining an optimized markdown schedule, a specific example of one product and one store is described. The extension of that solution to multiple product-store combinations linked by a common percent-off markdown schedule requires implementation of an improved method for determining a markdown schedule in a system such as a general purpose computer specially programmed and adapted for markdown optimization.

For a schedule group with a single product and store, a $\beta$ value that does not change over time, deterministic demand, and no rules-restrictions on percent off, the best solution for a given optimization requirement is a single optimal price p*. Two potentially optimal solutions emerge. One potentially optimal solution concerns inventory exhaustion. A second potentially optimal solution arises from treating salvage value as cost.

Subject to the constraints of this example, the optimal schedule for inventory exhaustion is found by setting total demand D equal to the inventory I. Substituting this information into constant elasticity-price demand model formula gives the result:

$$I = Qe^{-\beta p + \nu}$$

Solving this equation for the constant p in this example yields the result:

$$p = \frac{\ln(Q) - \ln(I)}{\beta}$$

The price p thus derived is used for inventory optimization. An exact solution for the inventory problem can thus be derived on this highly simplified example When inventory is not constrained, maximum profit $\pi$ can be reached by setting the price to $1/\beta$ more than the cost c, as shown by the following formulas:

$$q = e^{-\beta p}$$

$$\frac{dq}{dp} = -\beta q$$

$$\pi = (p - c)q$$

$$\frac{d\pi}{dp} = q + (p - c)\frac{dq}{dp}$$

$$\frac{d\pi}{dp} = q - \beta(p - c)q$$

$$0 = q^*(1 - \beta(p^* - c))$$

$$p^* = c + \frac{1}{\beta}$$

For any given price, the quantity q is equal to the exponential function of the negative of price coefficient of elasticity $\beta$ multiplied times quantity q and the change in quantity with respect to price is the negative of the coefficient of elasticity $\beta$ multiplied times quantity q. Profit $\pi$ is defined as quantity q multiplied times the difference between price p and cost c. The change in profit $\pi$ with respect to price p is thus equal to the quantity q plus the change in price p with respect to quantity q, multiplied times the difference between price p and cost c. Replacing the change in quantity q with respect to price p with the negative of the coefficient of elasticity $\beta$ multiplied times quantity q yields the result that change in profit $\pi$ with respect to price p is equal to the quantity q less the coefficient of elasticity $\beta$ times the quantity q times the difference between price p and cost c. Solving for the maximum produces the result that maximum profit $\pi$ is equal to the cost plus the reciprocal of coefficient of elasticity $\beta$.

Another solution from this same example concerns the salvage cost s. The solution is similar in form to the cost solution set forth above, except that the resulting price p* is equal to the salvage cost s plus the reciprocal of the coefficient of elasticity $\beta$, that is:

$$p^* = c + \frac{1}{\beta}$$

This closed-form solution of this particular, highly simplified example, is described to explain the more general operation of an embodiment in accordance with the present invention in much more complicated circumstances. Although an exact solution has been derived in this highly constrained example, it will be appreciated that when multiple product-store combinations are linked together in the same schedule group it is not feasible to develop a closed-form solution. Instead, it is generally needed to apply an embodiment of a method and system in accordance with the present invention.

Even in this highly simplified single-product-and-store example, however, precise prediction of the price is not possible because of the inherently imperfect information known concerning shopper demand, which is stochastic in nature. The stochastic distribution of markdown behavior can come from variation in the statistical calculation of model parameters or from the statistical variation from the mean in shopper behavior, such as when inventory levels are small, for example. A markdown schedule is a monotonically decreasing function of time, such that prices are only allowed to decrease, not increase, during the clearance period. It therefore is desirable to start the markdown period with a price higher than the predicted optimum, with the expectation of lowering price later in the clearance period. The price can be lowered as planned if product sales reach or exceed expected levels. In the alternative, the higher price can stay in place if sales are at the low end of their probability distribution.

Referring now to FIG. 3, there is shown a graph depicting a relatively higher initial price in the markdown schedule as a hedge against stochastic variation. A vertical Inventory Axis (305) and a horizontal Time Axis (307) depict inventory as a monotonically decreasing function of time, representing depletion of inventory during a close-out. An Expected Inventory-Versus-Time Trajectory (310) would be associated through markdown optimization with a suggested price schedule including a particular initial price $p_0$. However, because of the inherently stochastic nature of retail clearance activity, the Expected Inventory-Versus-Time Trajectory (310) is not certain. Other inventory-versus-time trajectories may also offer. As show in FIG. 3, a First Lower Inventory-Versus-Time Trajectory (315) or a Second Lower Inventory-Versus-Time Trajectory (320) may result in a price trajectory leaving less inventory on hand than expected. This is because a too-low price results in over-depletion of inventory too early in the markdown period, precluding an optimized price trajectory. It is therefore desirable to choose starting price $p_0'$ higher than the expected price associated with the expected optimized markdown schedule. As shown in FIG. 3, such a higher initial price may result in a First Higher Initial Inventory-Versus-Time Trajectory (330) or a Second Higher Initial Inventory-Versus-Time Trajectory (335). The effect of this higher First Higher Initial Inventory-Versus-Time Trajectory (330) or s Second Higher Initial Inventory-Versus-Time Trajectory (335) can then be evaluated at a Decision Point (340) on a horizontal Time Axis (347). Sufficient inventory will then remain to develop a new markdown optimization schedule including a reduction in price to yield a First Reduced Inventory-Versus-Time Price Trajectory (355) or a Second Reduced Inventory-Versus-Time Trajectory (360), resulting in closer to optimal performance despite the presence of stochastic variability.

In another example, the value of coefficient of elasticity $\beta(t)$ can be allowed to decline over time to reflect shoppers' expectation of lower price as the clearance markdown period proceeds. The optimized price over time $p^*(t)$ would then be expected to decline over time.

Additional complexity must be introduced into the model to address the more general problem of joint optimization schedules for linked products and stores. When multiple product-store combinations are linked in the same schedule group, their percent-off discounts over time are required to be the same during the markdown clearance period. Product-store combinations are denoted as squares.

Figure 4:
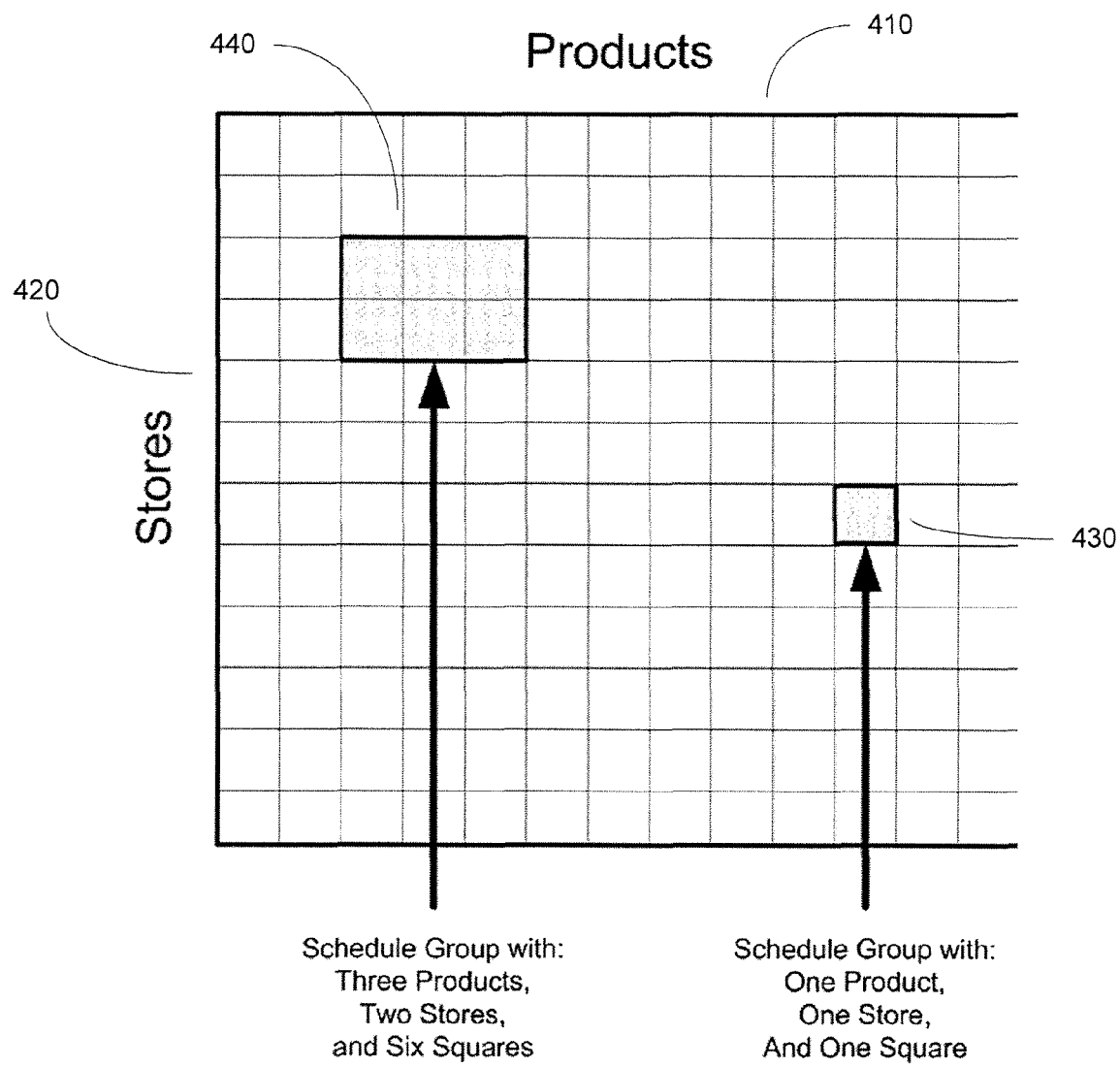
FIG. 4 is a matrix depicting scheduling groups of store-product combinations.

Referring now to FIG. 4, there is shown a graphic depiction of a matrix of products and stores. A First Matrix Axis (410) represents products. A Second Matrix Axis (420) represents stores or locations. In general, sets of squares representing inventory of particular products at particular stores are referred to as schedule groups. A First Schedule Group (430) depicts one product and one store in one square. A Second Schedule Group (440) depicts three products and two stores in six squares.

Linked Product and Store Scheduling Groups

When multiple product-store combinations are linked in the same schedule group, the optimized price trajectory $p^*(t)$ is no longer constant even if the coefficient of elasticity $\beta$ is constant for each product and store. For example, the optimized price $p^*(t)$ over time changes when one or more of the stores runs out of its inventory of one or more of the products. Once a square runs out of inventory during the markdown, there is a downward change in the optimized price. Any square running out of inventory before markdown end would be more profitable with a higher price that would sell the same inventory more slowly. Once that square sells out, there is less pressure to keep the price $p^*(t)$ up and price $p^*(t)$ adjusts downward when the inventory of that square is exhausted.

Calculating the optimized price trajectory $p^*(t)$ for a schedule group with a large number of squares is difficult. A mathematical closed form solution is expected to exist if all the squares have the same value for the coefficient of elasticity $\beta$, even if they have different quantity $q_0$, time dependent demand TDD(t), inventory I, and salvage cost s values. However, such a solution requires determining the order of square exhaustion amid the varying parameters in the model. The determination of a mathematically closed form solution is complicated, difficult to calculate, computationally expensive, and believed to be not generally feasible before development of an embodiment in accordance with the present invention. If the values for the coefficient of elasticity $\beta$ are different for different squares in the schedule group, then any mathematical closed form is going to be difficult to formulate and even more difficult to solve numerically.

Combinatorial Nested Search

Even when a mathematically-closed solution for markdown price can be readily determined, business rules impose additional constraints on markdown pricing. The problem is multi-dimensionally computationally complex. Some number of price points depending on some rules are selected from another number of choices with transition dates that conform to other rules. An analytic solution method might seek the price trajectory p(t) closest to the mathematically optimized pricing $p^*(t)$ somewhere among all of the available rules-determined choices.

Instead of finding the closest rules-based solution to some mathematically-determined trajectory, an embodiment in accord with the present invention use a combinatorial search over the rules-based choices and evaluates the objective function to optimize the schedule from among the rules-based choices. As a complete search of all the possible choices can be computationally enormous, an embodiment in accordance with the present invention divides the search into two phases, price points and step dates, and then selects a subset of the choices to create a targeted search of the markdown price choices.

The markdown optimization is explained in more detail hereinbelow. As described below, the method comprises distribution center allocation. Following distribution center allocation, control of markdown optimization passes to a series of three nested iterative loops shown. Each schedule group is independently optimized in the outer nested iterative loop. Selections of markdown price points form the middle iterative loop and evaluation of varying dates of their realization form the innermost iterative loop of the markdown optimization.

Figure 5:
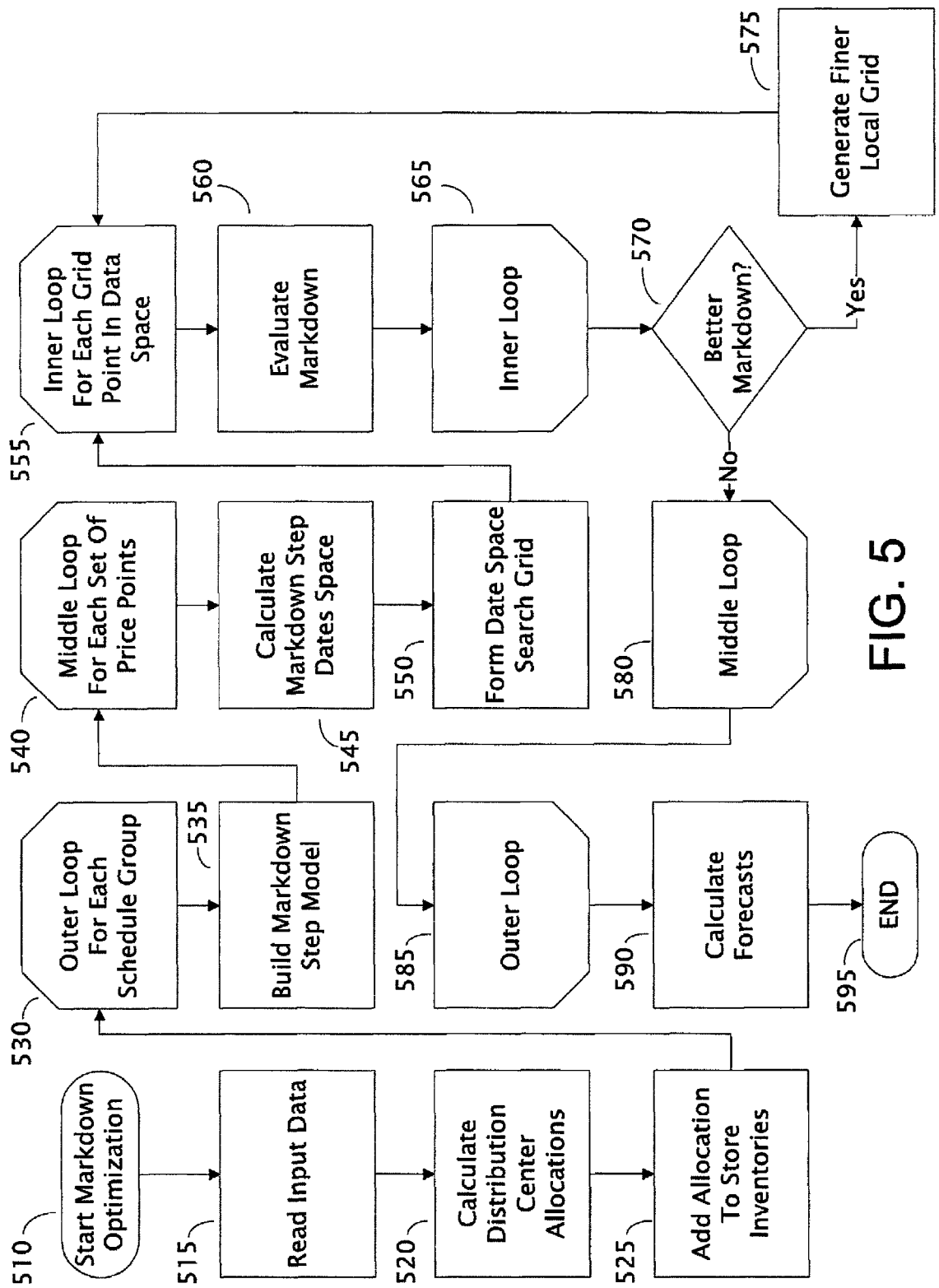
FIG. 5 is a flow chart depicting a data processing operation as implemented in one embodiment of the invention.

Referring now to FIG. 5, there is shown a flow control diagram for a markdown optimization method in accordance with the present invention. Control starts with a Start Markdown Optimization Initiation (510), which initiates the system and prepares storage space for input data, parameters, and calculated output. Control passes next to a Read Input Data Process (515), which reads in data including sales history, current inventory of stock on hand, and business rules defined by the user. Control passes next to a Calculate Distribution Center Allocations Process (520), which determines inventory allocations from distribution centers to individual stores for liquidation. Control passes next to an Add Allocation To Store Inventories Process (525), which increases the inventory of stock on hand at particular stores to reflect inventory allocations from distribution centers.

Referring still to FIG. 5, control passes next to an Outer Loop For Each Schedule Group Iteration (530), which repeats a programmatic loop for each schedule group, that is, for each square in the product-inventory matrix. Control passes next to a Build Markdown Step Model Process (535), which computes a schedule of price adjustments for the markdown schedule based on criteria such as, for example, preferred price points or set percentage discounts.

Referring still to FIG. 5, control passes next to a Middle Loop For Each Set Of Price Points Iteration (540), which repeats a programmatic loop for each set of price points or discount amounts in the markdown step model. Control passes next to a Calculate Markdown Step Dates Space Process (545), which determines the possible dates on which for taking markdown steps subject to constraints imposed by the user. Control passes next to a Form Date Space Search Grid Process (550), which computes a matrix grid of markdown-time points as markdown schedule candidates.

Referring still to FIG. 5, control passes next to an Inner Loop For Each Grid Point In Data Space Iteration (555), which repeats a programmatic loop for each point in the data space search grid formed by the preceding process. Control passes next to an Evaluate Markdown Process (560), which evaluates a utility function associated with candidates for membership in the markdown schedule. Control passes next to an Inner Loop Iteration End (565), which causes iteration back to the Inner Loop For Each Grid Point In Data Space Iteration (555) until the iteration termination condition is satisfied by covering each grid point in the data space.

Referring still to FIG. 5, control passes next to a Better Markdown Decision (570), which evaluates whether a better candidate markdown schedule has been identified. If the Better Markdown Decision (570) finds that a better candidate has been identified, then control passes to a Generate Finer Local Grid Process (575), which forms a new data space search grid on with discount-time pairs in closer proximity. Control would then pass back to the Inner Loop For Each Grid Point In Data Space Iteration (555). Formation of a denser search net promotes convergence towards a more optimized markdown schedule and helps reduce the risk of convergence on a less optimized markdown schedule.

Referring still to FIG. 5, if the Better Markdown Decision (570) does not find that a better candidate has been identified, then control passes to the Middle Loop Iteration End (580), which causes iteration back to the Middle Loop For Each Set Of Price Points Iteration (540), until the iteration termination condition is satisfied by processing each percentage or price point discount in the markdown step model. Control passes next to the Outer Loop Iteration End (585), which causes iteration of the Outer Loop For Each Schedule Group Iteration (530), until the iteration termination condition is satisfied by completing evaluation of each schedule group. The markdown schedule having then been determined, control passes next to a Calculate Forecasts Process (590), which calculates sales forecasts from the optimized markdown and model parameters. Control then passes to the End Terminator (595) and the procedure terminates.

One embodiment in accordance with the present invention includes an efficient combinatorial search algorithm. The said efficient combinatorial search algorithm encompasses and comprises price points search and an efficient a step dates search. Because the combinatorial search takes advantage of efficiencies recognized in the markdown problem, it is computationally efficient. The combinatorial search is therefore a suitable embodiment for providing a quick-method to re-model a markdown schedule, or to update a markdown schedule during the markdown period. The ability to update markdown schedules efficiently, without requiring an expensive separate run of a batch mode job, is an advantage of one embodiment.

Another embodiment still in accord with the present invention may incorporate more general optimization methods such as, for example, exhaustive search techniques, genetic algorithms, or simulated annealing. A preferred embodiment, however, will leverage business rules to provide fast approximate solution. Fast approximate solutions can be useful in realizing advantages such as on-demand optimization and forecasting and dynamic adjustment within the markdown period.

Price Points Search

An embodiment in accord with the present invention determines valid price points based on user-supplied rules. In one mode of practice, an embodiment in accordance with the present invention can specify valid price points as a list of approved percents off. In another mode of practice, an embodiment in accordance with the present invention can specify valid price points based on the final ending digit or digits of the price. For any price schedule specified by a rule set, the option of taking zero-percent-off, i.e., no markdown, is added to the list, such that no markdown at a given time is properly part of the set of points on a markdown schedule.

An embodiment in accord with the present invention tests the specified price points (whether defined as choices of percent off or ending number) against the minimum and maximum adjustments, if any, specified in the rules supplied by the user. An embodiment in accord with the present invention enumerate the complete list of choices of price points and sorts the list in price order from highest to lowest. For each price on the list, An embodiment in accord with the present invention uses the minimum and maximum percent change rules to determine which prices can come next to form a network of prices.

Figure 7:
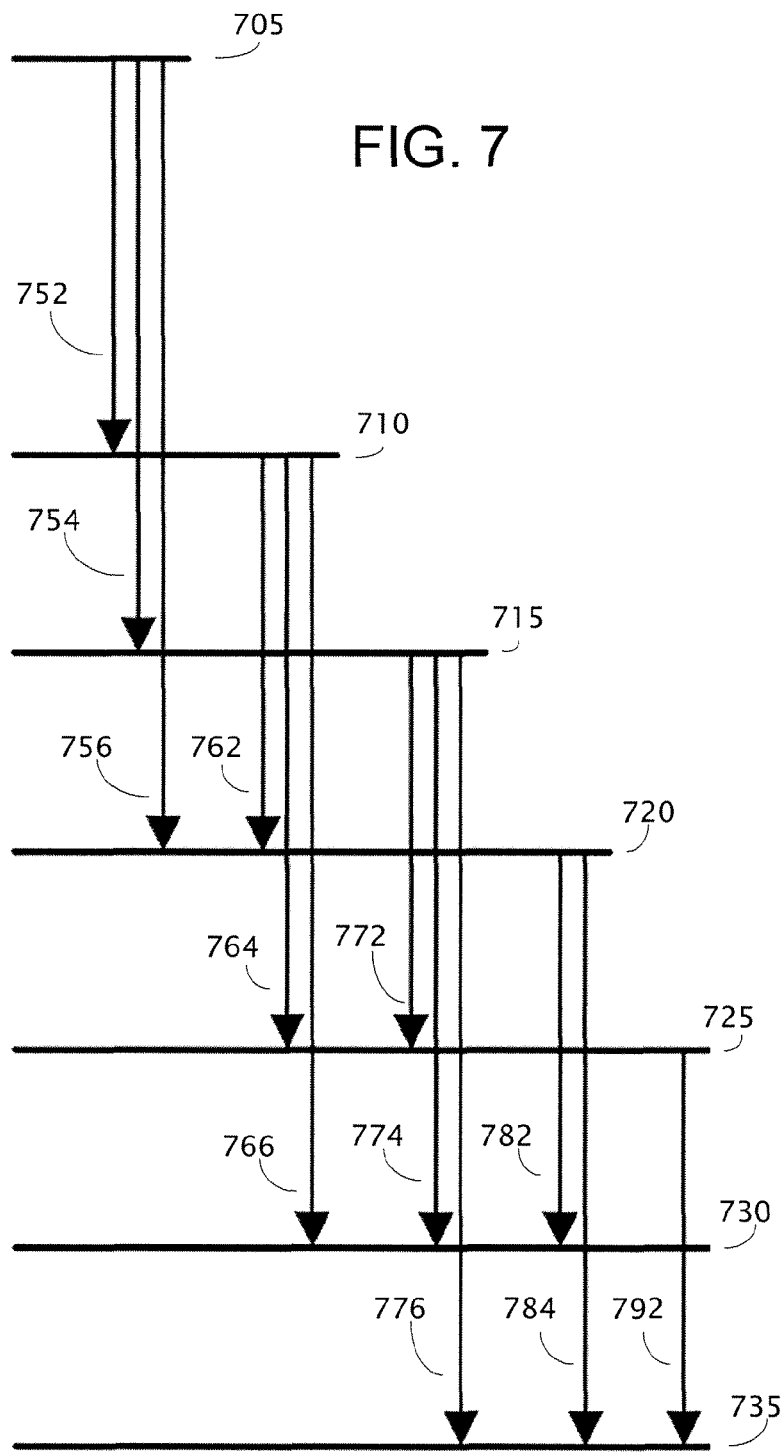
FIG. 7 shows a graph of price points including a network of allowed markdown changes.

Referring now to FIG. 7, there is depicted a graph of price points including a network of allowed markdown changes.

A examples specifies price points including a Regular Price Point (705), a Twenty Percent Discount Price Point (710), a Thirty Percent Discount Price Point (715), a Forty Percent Discount Price Point (720), a Fifty Percent Discount Price Point (725), and Sixty Percent Discount Price Point (730), and a Seventy Percent Discount Price Point (735). A network of allowed markdown changes is defined by a constraint set imposed on the set of all possible markdown transitions. For example, the network depicted in FIG. 7 may include minimum and maximum discount rules, such that a discount must be at least twenty percent of the regular price and cannot exceed forty percent of the regular price.

Referring still to FIG. 7, the network of allowable changes include a Regular Price To Twenty Percent Off Step (752), a Regular Price To Thirty Percent Off Step (754), and a Regular Price To Forty Percent Off Step (756). No move from the regular price is permitted to any level lower than forty percent off. The network of allowable changes also includes a Twenty Percent To Forty Percent Off Step (762), a Twenty Percent To Fifty Percent Off Step (764), and a Twenty Percent To Sixty Percent Off Step (766). A move from twenty percent off to thirty percent off is not permitted because it is not more than ten percent of the regular price, and thus does not meet the minimum discount step size rule. A move from twenty percent off to seventy percent off is not permitted because it would exceed the maximum allowable step size. The network of allowable changes further includes a Thirty Percent To Fifty Percent Off Step (772), a Thirty Percent To Sixty Percent Off Step (774), and a Thirty Percent To Seventy Percent Off Step (776). A move from thirty percent off to forty percent off is not allowed because it would not meet the minimum discount step size rule. The network of allowable changes further includes a Forty Percent To Sixty Percent Off Step (782), a Forty Percent To Seventy Percent Off Step (784), and a fifty Percent To Seventy Percent Off Step (792). These twelve changes are the only allowable changes in the network; no other changes are allowable in the network depicted. Other networks can be specified based on other possible price points and other rules and constraints.

Starting with zero-discount regular price, the paths through the network can be enumerated. A path in this context is a series of steps taken during the markdown period, After the zero-length path of regular price with no markdowns, the paths of length one are enumerated, then the paths of length two, and so on. An embodiment in accordance with the invention can include a price-point-path counting algorithm that increments the previous non-maximal markdown path until there are no more of that length, and then increases the number of markdowns by one. Those of ordinary skill in the art will recognize that other tree-traversing algorithms and network counting algorithms can be used and are deemed equivalent to the particular path-counting algorithm here described.

In some examples there may be many permissible price points. Such situations are common with ending numbers where hundreds of prices end in nine. A three-markdown search with 1000 ending-number price points and typical rules would define about 100 million combinations to try, which is not computationally viable. In such cases, the search tree can be trimmed using spaced samples. Small changes in price create small changes in revenue. Replacing the full tree with sampled spaces therefore costs little in objective value. This replacement is extremely valuable, however, as a computer-time-saving heuristic. If the step space includes N choices a sample including only K branches is desired, then every $M^{th}$ choice on the list is used, where M=N/K. All choices are used if there are no more than K choices. The value can be K is reduced as the number of markdown steps increases to keep the total search from growing too fast as the number of markdown steps increase.

Step Dates Search

After one embodiment in accordance with the present invention has defined a sequence of prices, it next identifies the dates for price changes, that is, step dates. Moving step dates later would appear to increase the average price through the markdown, but may detract from sales. Solving this scheduling problem in a mathematically closed form has been elusive for multi-square schedule groups. Accordingly, one embodiment according to the present invention performs a step-dates search for each price-points path and evaluates the resulting markdown schedule.

For a single markdown the only decision is when the markdown starts with earliest and latest possible dates determined by the rules. For multiple markdown steps there exists a complex space of date choices. The step-date space is convex; if dates $d_1, d_2, \ldots, d_n$ are rules-valid start dates for n markdown steps and dates $e_1, e_2, \ldots, e_n$ are also rules-valid, then the convex-combination dates are also valid. The convex-combination of the two series can express as follows:

$$\lambda d_1 + (1-\lambda)e_1,$$

$$\lambda d_2 + (1-\lambda)e_2,$$

$$\ldots,$$

$$\lambda d_n + (1-\lambda)e_n,$$

The convex combination dates are valid even if fractional dates are rounded to the nearest whole day after the convex-combination calculation. The parameter $\lambda$ varies between zero and one, inclusively. Because the convex-combination is within the search space, this function the term $\lambda$ provides a parameter the variation of which can be used to specify different points within the permissible space.

An embodiment in accordance with the present invention with respect to the example of a single-markdown case identifies the earliest and latest start date for $d_1$ and $e_1$ and we varies $\lambda$ from zero to one. The search divides the zero-to-one search space into five even spacings with six samples, defined by $\lambda=0.0, \lambda=0.2, \lambda=0.4, \lambda=0.6, \lambda=0.8, \lambda=1.0$. An embodiment of the present invention can evaluate the markdown schedule at each of these points to identify the best values for $\lambda$ from this set. The embodiment uses the $\lambda$ values on either side of the best of these (but not less than zero nor greater than one) as boundaries for another five-point search.

An embodiment in accordance with the present invention addresses the multiple-markdown case by expanding the search space to two dimensions. The dates $d_1, d_2, \ldots, d_n$ are in this embodiment the earliest dates the rules allow and $e_1, e_2, \ldots, e_n$ are the latest. The embodiment determines the earliest-latest window for each step date by working backward with the shortest duration allowed by the rules for each price point and, if there is a maximum duration for the last price point, with the longest duration. The embodiment works forward with the shortest duration for price points and, if there is already a markdown, with the longest duration. The combination of these constraints defines a minimum and maximum date for each step date.

An embodiment which determines $d_j$ and $e_j$ in this manner typically leaves all the middle steps of the convex combination at their shortest possible length, because $d_j$ packs markdown steps at the earlier dates and $e_j$ packs markdown steps at the later dates. In order to enhance the flexibility of the duration of the middle steps, an embodiment in accordance with the present invention creates another pair of endpoints $f_j$ and $g_j$. The embodiment determines one of these series by setting the first markdown as short as possible and all the others as long as possible. The embodiment determines the other of these series by setting the last markdown as short as possible and all the others as short as possible. Unless the two series are identical, one of the two will be consistently earlier than the other. The earlier of the two series, if they are not identical, is $f_1, f_2, \ldots, f_n$; the other series is $g_1, g_2, \ldots, g_n$.

An embodiment creates a two-dimensional square of solution search space with search parameters $\lambda$ and $\mu$. The embodiment defines the schedule of dates for each pair of values of $\lambda$ and $\mu$ as follows:

$$\mu(\lambda d_1+(1-\lambda)e_1)+(1-\mu)(\lambda f_1+(1-\lambda)g_1)),$$

$$\mu(\lambda d_2+(1-\lambda)e_2)+(1-\mu)(\lambda f_2+(1-\lambda)g_2)),$$

$$\ldots,$$

$$\mu(\lambda d_n+(1-\lambda)e_n)+(1-\mu)(\lambda f_n+(1-\lambda)g_n)),$$

The embodiment can search over a four-by-four grid of sixteen possibilities in $\lambda$ and $\mu$ going from zero to one by thirds. Whichever part of this grid produces the best results can then be used to define the next, smaller search area. This shrinking of search rectangles can continue until the process reaches suitable convergence criteria such as, for example, the observance of no improvement in the objective function. Adjustments to $\lambda$ can be considered as adjusting the average price. Adjustments to $\mu$ can be considered as adjusting the variability of price. The two parameters together would thus approximate a two-moment search of price distribution over the markdown interval.

Figure 8:
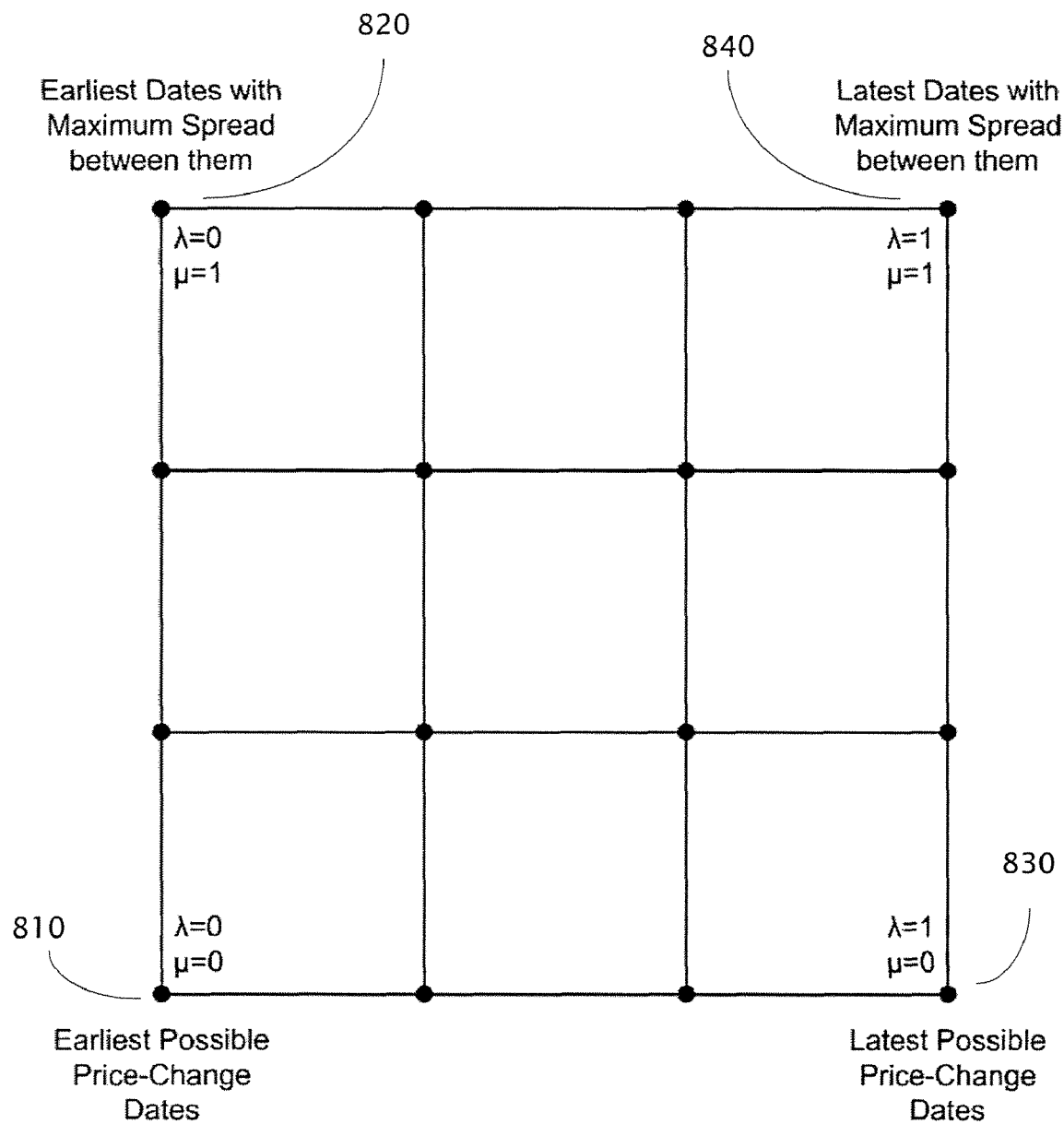
FIG. 8 depicts a four-by-four grid of possible markdown dates for a given price point to be evaluated by the data processing operations of one embodiment of the invention.

Referring now to FIG. 8, there is depicted graphically a four-by-four grid of sixteen possibilities to be evaluated. One node at a first corner of the grid is an Earliest Possible Price Change Dates Node (810), in which $\lambda$ and $\mu$ are both set equal to zero. Another node at a second corner of the grid is an Earliest Dates With Maximum Spread Node (820), in which $\lambda$ is zero and $\mu$ is one. Another node at a third corner of the grid is a Latest Possible Price Change Dates Node (830), in which $\lambda$ is one and $\lambda$ is zero. Another node at a fourth corner of the grid is a Latest Dates With Maximum Spread Node (840), in which $\lambda$ and $\mu$ are both set equal to one. Other intermediate points on the node represent combinations of these extremes, with $\lambda$ and $\mu$ each taking on values of, for example, ⅓ and ⅔.

As an aid to computation, in one embodiment these calculations are facilitated by keeping the time dependent demand TDD(t) in the form of a cumulative demand for each date, $TDD_{total}(t)$. As a further aid to computation, the coefficient of elasticity $\beta$ is treated in this embodiment as being constant. In this embodiment, the $t_0$-to-$t_1$ demand for price p is determined as follows:

$$(TDD_{total}(t_1)-TDD_{total}(t_0))e^{q_0-\beta p+v}$$

Distribution Center and Inventory Allocation

It is another feature of one embodiment in accord with the present invention to provide optimized allocation of distribution center inventory. The inventory available for a markdown square can come from the store itself and can be augmented by inventory from a distribution center. Each product has zero or more distribution centers, each of which has inventory and a list of stores in the markdown.

In the distribution center allocation stage, an embodiment in accordance with the present invention represent the post-distribution-center-allocation markdown optimization with the single-price margin optimization for maximum revenue r. The assumed pricing strategy is to sell all inventory so long as the incremental value of inventory dr/dI exceeds the salvage value s and so long as the price p does not exceed regular price $p_{reg}$. An optimized inventory allocation occurs when every store receiving inventory from the distribution is operating at the same incremental revenue per unit inventory dr/dI. Defining the total quantity term Q as in the total-quantity formula above produces the following results for incremental revenue per unit dr/dI:

$$\frac{dr}{dI} = p_{reg}, \text{ when } I < Qe^{-\beta p_{reg}}$$

$$\frac{dr}{dI} = s, \text{ when } I > Qe^{-\beta s-1} \text{ otherwise,}$$

$$\frac{dr}{dI} = \frac{\ln Q - \ln I}{\beta}$$

The −1 term in the exponent where dr/dI=s is an asymmetry in these equations. The upper limit for the markdown price p is regular price $p_{reg}$. The lower limit for the price p is that the incremental value of inventory is not allowed to fall below salvage value s. This causes a $1/\beta$ discontinuity at I=Q exp(−$p_{reg}$) in the incremental value of inventory.

The distribution center strategy in one embodiment is to allocate inventory initially and then to move that inventory from lower to higher incremental value. This is a stable process because the incremental value of inventory decreases for each store as inventory is added.

An improved inventory allocation in one embodiment in accordance with the present invention determines preferable allocations of inventory from distribution centers to stores. Allocations can be based on particular considerations, examples of which are described below, or on a combination of considerations such as those herein described.

Allocations in one embodiment can be based on a demand forecast. Demand forecasts can be store-product level. Demand forecasts can also be based on promotional and markdown schedule. Demand forecasts can also be based on promotional and markdown schedules that are based on business rules. Demand forecasts can also be based on promotional and markdown schedules that are optimized based on the amount of store-level inventory available.

Allocation in another embodiment can be based on financial, marketing and merchandising strategies. Financial strategies include dollar sales, gross profit, net profit, GMROI and markdown dollars. Marketing strategies include price image, unit sales, equivalized unit sales. Merchandising strategies include inventory levels, service levels.

Allocation can be based on other considerations in particular embodiments. In one embodiment allocation based on shipping, storage, capital and shrinkage costs. In one embodiment allocation can be based on amount of inventory already existing in store and in transit to store. In one embodiment allocation decision allows for intra-store transfers.

Forecasting

One embodiment in accordance with the present invention provides inventory and unit-sales forecasts. In one example of a retail pricing model, products are aggregated at three levels and stores at two. Through a product-linking process in one embodiment, products are aggregated into price families where prices, brand, and seasonal trends can be linked. Products in this embodiment are also aggregated into demand groups where seasonal trends can be linked. Products in this embodiment also aggregated into categories where relative store weights are linked. Through a store-linking process in this embodiment, stores are aggregated into superstores where model parameters can be linked and into zones where optimized price assignments can be linked. In this embodiment the model parameters described hereinabove are then computed for aggregated products and stores in the regular (non-markdown) price-optimization product.

The markdown optimization requires model parameters by product and store for individual markdown squares. One embodiment in accord with the present invention use a maximum-likelihood statistical-model calculation to refine the aggregated parameters down to the individual product-store level. For each square, the Bayesian prior weights of the aggregated parameters depend on the number of sales observations available. In one embodiment, individual-square model parameters are used to calculate the initial inventory for the markdown process because the input inventory is typically for an earlier time.

During the markdown interval, an embodiment in accordance with the invention forecasts product sales in each store using the model parameters and using a markdown-wide v parameter for the promotional lift of having a markdown. In this embodiment these forecasts based on individual-square model parameters are used in the markdown optimization to calculate the margin and inventory levels for the optimization described hereinabove. These forecasts in this embodiment are then aggregated and reported to the user. These forecast can account for regular pricing, promotions, and markdown. The forecast for unit sales in this embodiment are subtracted from inventory to produce an inventory forecast.

Implementation in a Computer System

A functional unit is an entity of hardware or software, or both, capable of accomplishing a specified purpose. Hardware is all or part of the physical components of an information processing system. Software includes all or part of the programs, procedures, rules, and associated documentation of an information processing system. An information processing system is one or more data processing systems and devices, such as office and communication equipment, that perform information processing. A data processing system includes one or more computers, peripheral equipment, and software that perform data processing.

A computer is a functional unit that can perform substantial computations, including numerous arithmetic operations and logic operations without human intervention. A computer can consist of a stand-alone unit or can comprise several interconnected units. In information processing, the term computer usually refers to a digital computer, which is a computer that is controlled by internally stored programs and that is capable of using common storage for all or part of a program and also for all or part of the data necessary for the execution of the programs; performing user-designated manipulation of digitally represented discrete data, including arithmetic operations and logic operations; and executing programs that modify themselves during their execution. A computer program is syntactic unit that conforms to the rules of a particular programming language and that is composed of declarations and statements or instructions needed to solve a certain function, task, or problem. A programming language is an artificial language (a language whose rules are explicitly established prior to its use) for expressing programs.

A computer typically includes a processor, including at least an instruction control unit and an arithmetic and logic unit. The processor is generally a functional unit that interprets and executes instructions. An instruction control unit in a processor is generally the part that retrieves instructions in proper sequence, interprets each instruction, and applies the proper signals to the arithmetic and logic unit and other parts in accordance with this interpretation. The arithmetic and logic unit in a processor is generally the part that performs arithmetic operations and logic operations.

A program or computer program is generally a syntactic unit that conforms to the rules of a particular programming language and that is composed of declarations and statements or instructions needed to solve a certain function, task, or problem. A programming language is generally an artificial language for expressing programs. A computer system is generally one or more computers, peripheral equipment, and software that perform data processing. An end user in general includes a person, device, program, or computer system that utilizes a computer network for the purpose of data processing and information exchange.

Software for an information processing system can be stored as instructions and the like on a computer readable medium in a variety of forms. The present invention applies equally regardless of the particular type of signal bearing computer readable media actually used to carry out the distribution. Computer readable media includes any recording medium in which computer code may be fixed, including but not limited to CD's, DVD's, semiconductor RAM, ROM, or flash memory, paper tape, punch cards, and any optical, magnetic, or semiconductor recording medium or the like. Examples of computer readable media include recordable-type media such as floppy disk, a hard disk drive, a RAM, and CD-ROMs, DVD-ROMs, an online internet web site, tape storage, and compact flash storage, and transmission-type media such as digital and analog communications links, and any other volatile or non-volatile mass storage system readable by the computer. The computer readable medium includes cooperating or interconnected computer readable media, which exist exclusively on single computer system or are distributed among multiple interconnected computer systems that may be local or remote. Many other configurations of these and similar components (which can also comprise computer system) are considered equivalent and are intended to be encompassed within the scope of the claims herein.

Figure 6:
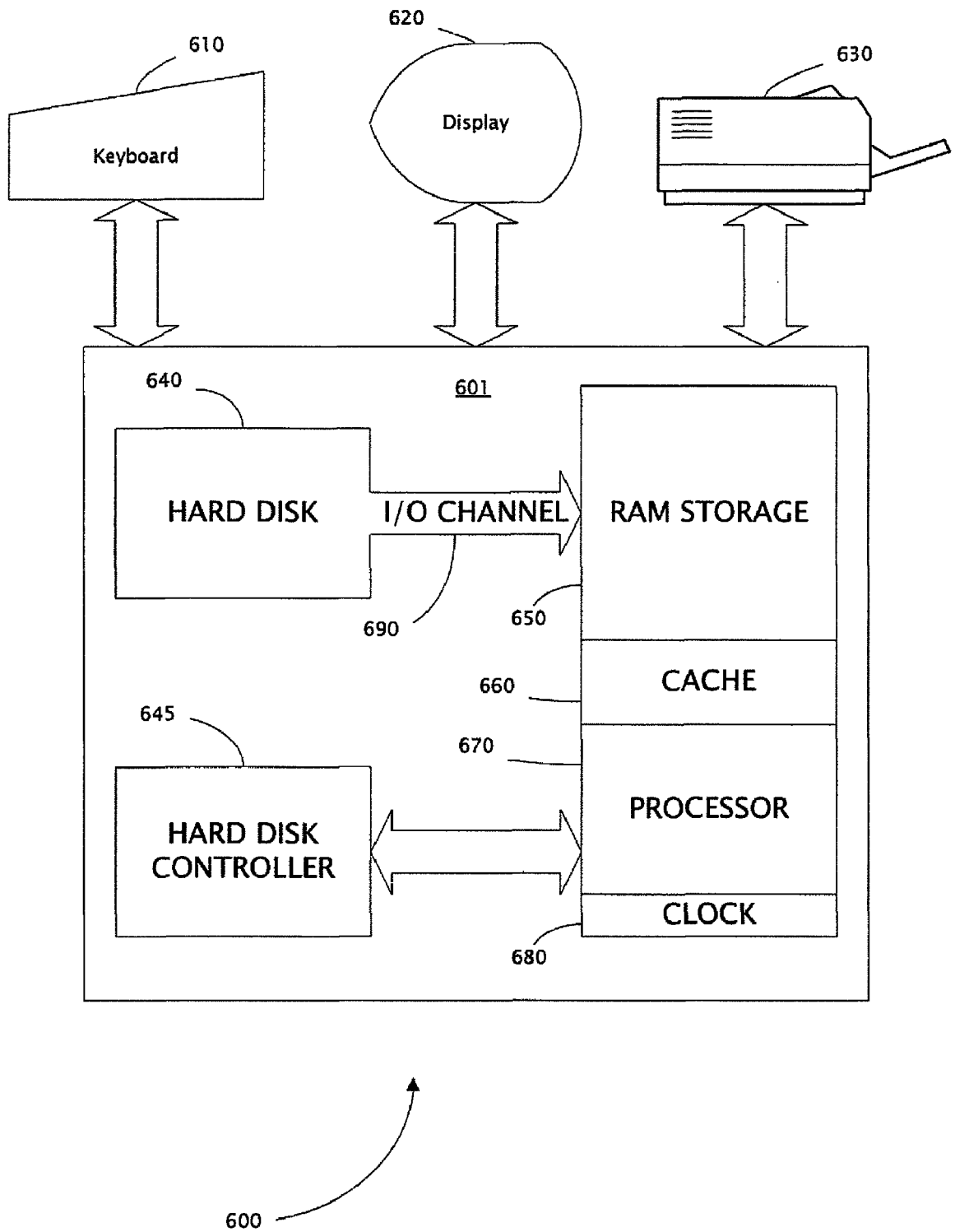
FIG. 6 is a block diagram that generally depicts a configuration of one embodiment of hardware suitable for improved markdown optimization.

Referring now to FIG. 6, there is disclosed a block diagram that generally depicts an example of a configuration of hardware (600) suitable for automatic mapping of raw data to a processing algorithm. A general-purpose digital computer (601) includes a hard disk (640), a hard disk controller (645), RAM storage (650), an optional cache (660), a processor (670), a clock (680), and various I/O channels (690). In one embodiment, the hard disk (640) stores markdown optimization application software, data for markdown optimization, business rules, and the like. Many different types of storage devices may be used and are considered equivalent to the hard disk (640), including but not limited to a floppy disk, a CD-ROM, a DVD-ROM, an online web site, tape storage, and compact flash storage. In other embodiments not shown, some or all of these units may be stored, accessed, or used off-site, as, for example, by an internet connection. The I/O channels (690) are communications channels whereby information is transmitted between RAM storage and the storage devices such as the hard disk (640). The general-purpose digital computer (601) may also include peripheral devices such as, for example, a keyboard (610), a display (620), or a printer (630) for providing run-time interaction and/or receiving results.

Specific Implementation Examples

The data processing operations described hereinabove have been implemented in practical applications. The data processing operations described have been executed in the Markdown Optimization Engine (MOE) which was included as part of the Khimetrics Markdown product. The Markdown Optimization Engine has produced markdown plans for ending-number price lists with hundreds of price points and for markdowns with thousands of product-store combinations.

The markdown modeling, optimization, and forecast software have been written in C/C++ on a Linux platform. These programs have been run from a user interface that displays summary data and from batch scripts. The optimization has been run initially at the beginning of a markdown and then weekly reoptimizations have been run to adjust the markdown prices and intervals when sales are higher or lower than originally modeled and forecast. If, for example, sales are higher than forecast then future price cuts can be delayed or reduced. If, for example, sales are lower than forecast then future price cuts can be hastened and deepened. In either event, the schedule always stays within the business rules for markdown. Data by product and store for markdown optimization and reoptimization have been accumulated in the form of weekly sales figures and inventory levels.

The Markdown Optimization Engine handles enterprise-scale optimizations within reasonable computer-time limits.

While one or more embodiments of the present invention have been illustrated in detail, the skilled artisan will appreciate that modifications and adaptations to those embodiments may be made without departing from the scope of the present invention as set forth in the following claims. Although the preferred embodiments of the invention have been illustrated and described in detail, it will be readily apparent to those skilled in the art that various modifications may be made therein without departing from the spirit of the invention or from the scope of the appended claims. For example, the tasks and data processing operations described can be partitioned and sequenced in a variety of ways in addition to those specifically described herein.

Many other particular modes and embodiments of an attribute modeler in accordance with the teachings of the present invention are possible including, For example, reference price model in which the reference price of an item can be modeled based on attributes including, for example, product, store and time attributes. All such particular modes, embodiments, and the like are intended to be encompassed within the scope of this application.

While the methods and embodiments disclosed herein have been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

While the present invention has been described in the context of particular exemplary data structures, processes, and systems, those of ordinary skill in the art will appreciate that the processes of the present invention are capable of being distributed in the form of a computer readable medium of instructions and a variety of forms and that the present invention applies equally regardless of the particular type of signal bearing computer readable media actually used to carry out the distribution. Computer readable media includes any recording medium in which computer code may be fixed, including but not limited to CD's, DVD's, semiconductor RAM, ROM, or flash memory, paper tape, punch cards, and any optical, magnetic, or semiconductor recording medium or the like. Examples of computer readable media include recordable-type media such as floppy disc, a hard disk drive, a RAM, and CD-ROMs, DVD-ROMs, an online internet web site, tape storage, and compact flash storage, and transmission-type media such as digital and analog communications links, and any other volatile or non-volatile mass storage system readable by the computer. The computer readable medium includes cooperating or interconnected computer readable media, which exist exclusively on single computer system or are distributed among multiple interconnected computer systems that may be local or remote. Those skilled in the art will also recognize many other configurations of these and similar components which can also comprise computer system, which are considered equivalent and are intended to be encompassed within the scope of the claims herein.

Although embodiments have been shown and described, it is to be understood that various modifications and substitutions, as well as rearrangements of parts and components, can be made by those skilled in the art, without departing from the normal spirit and scope of this invention. Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein. The appended claims are contemplated to cover the present invention any and all modifications, variations, or equivalents that fall within the true spirit and scope of the basic underlying principles disclosed and claimed herein.

We claim:

1. A computer-implemented method of markdown schedule optimization comprising:
   identifying a measurable markdown objective;
   identifying a scheduling group including at least one product and at least one store;
   calculating allocation of inventory from a distribution center to a store in the scheduling group;
   determining a schedule of price reductions for the scheduling group, the schedule of price reductions indicating degrees and times of reductions in price in the scheduling group, wherein the determining of the schedule of price reductions is performed using a processor of a computer and further comprises:
   selecting a permissible markdown price step from a group of permissible price steps;
   providing a convergence criterion with respect to the measurable markdown objective;
   defining a first subspace of permissible markdown times for implementing the permissible markdown price step;
   identifying a preferable permissible markdown time for implementing the permissible markdown price step;
   evaluating a markdown schedule comprising the preferable permissible markdown time and the permissible markdown price step to determine that the convergence criterion is not met; and
   based on the convergence criterion not being met, defining a second subspace of permissible markdown times for implementing the permissible markdown price step, updating the markdown schedule using the second subspace, and evaluating the updated markdown schedule;
   calculating forecasts from optimized markdown and model parameters; and
   outputting results including the updated markdown schedule.

2. The method according to claim 1 wherein the measurable markdown objective seeks reduction in inventory.

3. The computer-implemented method according to claim 1 wherein the measurable markdown objective seeks increase in margin.

4. The computer implemented method according to claim 1 wherein the schedule of price reductions is updated during the markdown based on information collected during the markdown.

5. The computer implemented method according to claim 1 wherein the schedule of price reductions is based on sales data for individual product lines.

6. The computer-implemented method of claim 1, wherein:
the convergence criterion is representative of an observance of no improvement in the updated markdown schedule.

7. A computer-implemented method of updating a markdown schedule, the method comprising: identifying a scheduling group including at least one product and at least one store;
   determining an initial schedule of price reductions for the scheduling group, the initial schedule of price reductions indicating degrees and times of reductions in price in the scheduling group;
   implementing the initial schedule of price reductions in the scheduling group;
   collecting markdown sales information about sales in the scheduling group after implementing the initial schedule of price reductions;
   updating the initial schedule of price reductions to determine a second schedule of price reductions, the updating of the initial schedule of price reductions being performed using a processor of a computer and further comprising:
   selecting a permissible markdown price step from the group of permissible price steps;
   providing a convergence criterion that defines a sufficiently optimized markdown schedule;
   defining a first subspace of permissible markdown times for implementing the permissible markdown price step;
   identifying a preferable permissible markdown time for implementing the permissible markdown price step;
   evaluating a markdown schedule comprising the preferable permissible markdown time and the permissible markdown price step to determine that the convergence criterion is not met, and based on the convergence criterion not being met, defining a second subspace of permissible markdown times for implementing the permissible markdown price step, updating the markdown schedule using the second subspace, and evaluating the updated markdown schedule; and
   outputting results including the updated markdown schedule.

8. The computer-implemented method of claim 7, wherein:
the convergence criterion is representative of an observance of no improvement in the updated markdown schedule.

9. A computer-implemented method of determining a schedule of reductions in prices, the method comprising:
   identifying a scheduling group including at least one product and at least one store,
   determining an expected optimized schedule of price reductions for the scheduling group, the expected optimized schedule of price reductions indicating degrees and times of reductions in price in the scheduling group, the determining of the expected optimized schedule being performed using a processor of a computer;
   identifying an intermediate markdown time;
   determining an actual schedule of price reductions such that the price of a product in the scheduling group at the intermediate markdown time is higher under the actual schedule of price reductions than under the expected optimized schedule of price reductions;
   evaluating sales at the intermediate markdown time, the evaluating of the sales being based on a determination that a convergence criterion is not met; and
   determining an updated schedule of price reductions based on the evaluating of the sales at the intermediate markdown time.

10. The computer-implemented method of claim 9, wherein:
the convergence criterion is representative of an observance of no improvement in the sales under evaluation at the intermediate markdown time.

11. A non-transitory markdown schedule optimization computer program product to update a markdown schedule, the markdown schedule optimization computer program product comprising:
   a computer usable medium and computer readable program code embedded on the computer readable medium, the computer readable program code comprising:
   computer code to identify a scheduling group including at least one product and at least one store;
   computer code to determine an expected optimized schedule of price reductions for the scheduling group, the expected optimized schedule of price reductions indicating degrees and times of reductions in price in the scheduling group;
   computer code to determine an intermediate markdown time;
   computer code to determine an actual schedule of price reductions such that the price of a product in the scheduling group at the intermediate markdown time is higher under the actual schedule of price reductions than under the expected optimized schedule of price reductions;
   computer code to evaluate sales at the intermediate markdown time, the evaluating of the sales being based on a determination that a convergence criterion is not met; and
   computer code to determine an updated schedule of price reductions based on the evaluating of the sales at the intermediate markdown time.

12. The markdown schedule optimization computer program product of claim 11, wherein:
the convergence criterion is representative of an observance of no improvement in the sales under evaluation at the intermediate markdown time.

* * * * *